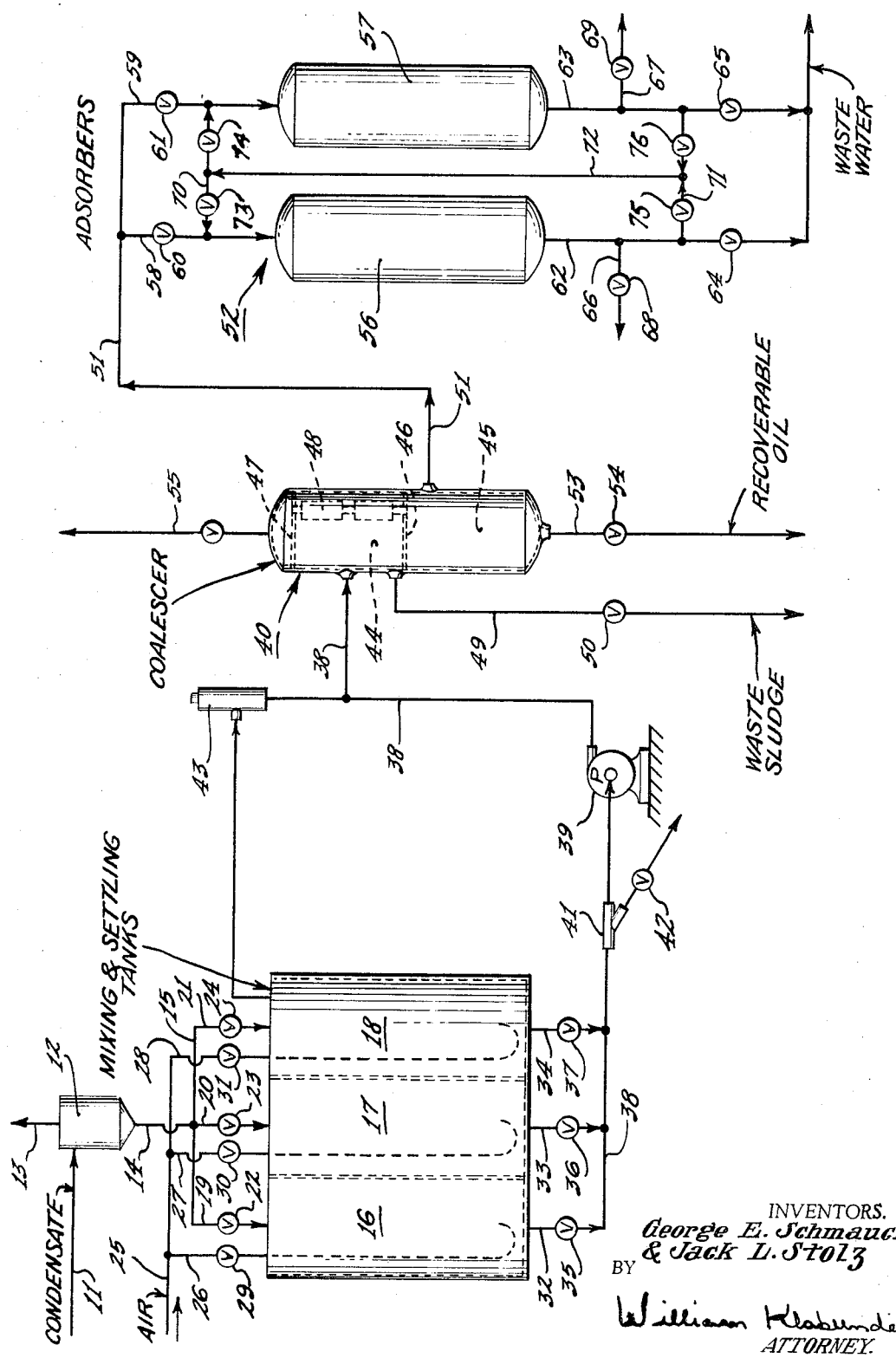

United States Patent Office 3,363,399
Patented Jan. 16, 1968

3,363,399
PURIFICATION OF OIL-CONTAMINATED WATER
George E. Schmauch, Macungie and Jack L. Stolz, Allentown, Pa., assignors to Air Products and Chemicals, Inc., Allentown, Pa., a corporation of Delaware
Continuation-in-part of application Ser. No. 287,809, June 14, 1963. This application Sept. 26, 1966, Ser. No. 592,699
5 Claims. (Cl. 55—45)

ABSTRACT OF THE DISCLOSURE

Water contaminated with oil heavier than water and with water-soluble components, such as an air compressor condensate in the form of an emulsion containing such contaminants, is treated for recovery of the oil and for removal of such water-soluble components by the successive operations of: de-aerating the contaminated condensate emulsion, as needed, in a pre-separating zone for release of excessive amounts of incorporated air; adding a chemical de-emulsifying agent to the relatively air-free emulsion; mildly agitating the mixture in a mixing and settling zone by injection of gaseous material, such as air, in an amount sufficient only to promote mixing and to accelerate the resultant reaction, while permitting concomitant partial settling of the heavier oil-containing fraction; coalescing and filtering the de-emulsified mixture in a coalescing zone to remove any heavy sludge; separating the remaining liquid in a settling zone into a lower layer containing the oil component and an upper layer containing the water-soluble components; separately withdrawing the heavier recoverable oil fraction and the lighter, oil-free, contaminated water fraction from the settling zone; and adsorbing the water soluble components from the lighter, contaminated water fraction in an adsorbing zone. In a typical operation according to the invention a condensate emulsion containing triarylphosphate in an amount between about 0.1–0.5 weight percent is treated with about 0.2 weight percent of calcium chloride as the de-emulsifier.

---

This application is a continuation-in-part of Ser. No. 287,809, filed June 14, 1963 (now abandoned).

This invention relates to a system for the treatment of oil-contaminated water, for recovery of reusable components and/or conditioning of components to render them acceptable for normal means of waste disposal. The invention is especially directed to the treatment of aqueous mixtures or emulsions in which water is the substantial major component and a contaminant, which is termed oil in its broader sense, is present in relatively small proportion, such as less than one percent.

The invention finds particular advantageous application in the treatment of aqueous emulsions in which the contaminant oil is the heavier component, and is for the most part not readily separable from the lighter water component by ordinary settling, and which to some degree dissolves in the water and forms therewith or therein contaminant compounds which must be removed from the water before the latter is disposed of, either to waste or for some useful application.

Even more particularly, the invention finds advantageous application in the treatment of compressor condensate formed as waste material in industrial processes in order to recover for possible reuse any valuable components of the condensate, for example, lubricating oil; to condition the water component of the condensate for acceptance, in accordance with local anti-pollution laws, by normally available waste disposal means, such as natural bodies of water; and to remove heavier or sludge components for disposal by other suitable means or for possible further treatment for the recovery of additional lubricant.

It is well known that the compression and cooling of air results in condensation of the contained moisture. In the compression of great quantities of air to relatively high pressure, there is a considerable amount of water to be disposed of, and considerable heat is generated in the compressor unit. At the high temperatures developed, ordinary lubricants, such as petroleum oils, are susceptible to decomposition, with resultant carbon residue formation and increased fire hazard.

To overcome the problem of excessive heat, synthetic lubricants are generally employed, thereby appreciably reducing the safety hazard. Synthetic lubricants found to be quite satisfactory in overcoming the problem of heat are triaryl phosphates, one such lubricant being tricresyl phosphate, and similar organic lubricants.

Synthetic lubricant is continuously carried away from the lubricated cylinder and piston surfaces with the formed water, thus necessitating a continuous make-up of lubricant, which may amount to several gallons per day. The synthetic lubricant as well as slight amounts of hydrocarbon lubricants employed in areas adjacent to the compression chamber, but which work their way onto the cylinder walls, are thus incorporated in the body of condensate to be eliminated.

With respect to the disposal of such condensate, it is a common practice to discharge the body of condensate, directly or indirectly, into available natural bodies of water, such as lakes, streams, rivers, bays, etc.

There is a special problem, however, in connection with the matter of condensate disposal when triaryl phosphates are employed as lubricants, since these compounds have been found to be harmful when ingested by wildlife, as will be inevitable. The degree of lubricant contamination in the waste water will depend upon atmospheric humidity during compressor operation, but under normal conditions the condensate will contain about 0.1–0.5 weight percent of lubricant. The absolute quantity of lubricant to be disposed of is approximately that which is added to the compressor lubricating system, amounting to several gallons per day per plant.

An additional and secondary adverse effect of condensate contamination by triaryl phosphate type lubricant is that a small amount of the lubricant, about 5–10 p.p.m., dissolves in the condensed water, forming phenolic compounds. Phenols are taste-producing organic compounds which render any water in which they are present unpalatable or otherwise unsuitable for human consumption. Thus, where disposal of the waste water is to areas drained by fresh-water streams, rivers, lakes, wells, etc. which, directly or indirectly, form a source of drinking water, it is imperative that the taste-producing phenolic compounds be removed from the waste water before such disposal. In some areas, contamination limits are set by local regulations.

The various known systems for separating oil-in-water and water-in-oil mixtures are for the most part unsuitable for the decontamination of condensates of the aforementioned type, since the lubricants or oils handled by such systems generally have a specific gravity lower than that of water. The water therefore settles to the bottom of the mixture which has been de-emulsified where it may readily be drawn off and disposed of, with or without other treatment.

In the separation process of this invention there is provision for the treatment of a condensate which is predominantly water containing a trace of highly undesirable, water-soluble contaminant compounds, and which contains less than one-half weight percent of recoverable oil which is heavier than the water. The condensate may also contain extremely minor amounts of oily compounds which are lighter than the water, such as hydrocarbons or petroleum based lubricants, atmospheric dust, rust, scale, etc.

In accordance with the invention, a condensate water emulsion, containing a relatively small amount of heavier lubricant material which dissolves slightly in the water, resulting in the formation of contaminating phenolic compounds, is processed for removal, and possible recovery, of the heavier lubricant material and for removal of the phenols from the resultant waste water. The process involves the steps of treating the emulsion by addition of a chemical de-emulsifying agent, preferably an electrolyte, with mild agitation of the mixture to accelerate the reaction between the condensate and the de-emulsifier and to separate and drive off the very small portion of oil which is lighter than water and which will collect on the top of the emulsion. The emulsion containing the heavier lubricant and some precipitated heavy lubricant passes into a coalescer where all of the undissolved heavy lubricant is coalesced and stripped out of the emulsion. The coalesced mixture separates into a heavier, recoverable lubricant phase and a lighter, contaminated waste water phase. The lubricant and contaminated water phases are separately withdrawn from a separating zone, the contaminated water being passed through an adsorbing zone to remove the contaminant phenolic compounds. The resultant purified water may then be disposed of safely.

In cases where the condensate, as received for treatment, contains an excessive amount of incorporated air, the condensate may be pretreated in known manner for complete and rapid removal of the air.

In one preferred mode of operation, the condensate is pretreated in a separate zone, such as a settler, to remove most of the air. Conveniently, this zone may be located directly above a mixing and settling zone so that the substantially air-free condensate may pass by gravity flow between the zones. The latter treating zone may be an open tank or vat or it may be covered and provided with a vent to the atmosphere. The rate of condensate formation depends upon the humidity in the air being compressed and condensate is treated as a batch after the accumulated condensate has reached a level several inches from the top of the mixing and settling zone. If continuous operation of the separation unit is desired, several treating tanks or vessels, such as three, may be provided, with manifold, valve, and control arrangements such that filling, treating, and pumping operations may be carried out simultaneously.

Conveniently, agitation of the body of liquid condensate in the mixing and settling zone may be accomplished by the injection of a gaseous material at a low level within the body of liquid, such flow being sufficient only to accelerate the de-emulsification by rapid and complete distribution of the de-emulsifying agent. However, the injection of gaseous material may be omitted if sufficient agitation occurs in subsequent transfer lines to insure the complete distribution of the de-emulsifying agent.

The de-emulsifying agent is added in relatively small amount, only about a few tenths of a percent by weight of the agent being required. Commercial grade calcium chloride has been found effective as an emulsion breaker in a proportion of about 0.2 weight percent. Calcium or sodium hydroxide and calcium hypochlorite may also be added simultaneously for pH adjustment and chlorination of the water when needed.

The mixture is then passed to a coalescer. The lubricant draw-off streams from the coalescing zone may be sent to waste or may be treated for recovery of the lubricant. While treatment of the sludge withdrawn from the receiving zone of the coalescer may not be economically feasible, the separating zone may yield sufficient lubricant to warrant recovery, as by treatment with alumina, fuller's earth, etc.

The contaminated water fraction withdrawn from the coalescer may be treated for removal of the dissolved phenols by being passed through a bed of adsorbent material, such as activated carbon. For uninterrupted operation, two adsorbers are provided, connected in series flow arrangement. The discharge line of each adsorber is provided with liquid draw-off taps for periodic testing to determine the degree of contamination of the water leaving the respective adsorber vessel. Testing of the water withdrawn from the tap at the bottom of the first adsorber will show when the adsorbent material in the first adsorber is spent, as indicated by the presence of phenol in the draw-off water. At such time, the first adsorber may be cut out temporarily while the bed of activated carbon or other adsorbent is regenerated or replaced with fresh material. During this period the second adsorber will function alone. After the first adsorber is re-charged, it may be placed back in service as the second adsorber in the series flow arrangement. This is readily accomplished by standard valve and switching devices. Water may be withdrawn periodically, such as daily, from the current second adsorber and tested to determine whether it meets the desired or required tolerable contamination limits.

For a fuller understanding of the invention, reference may be had to the following specification and claims taken in connection with the accompanying drawing forming a part of this application and diagrammatically illustrating as one embodiment of the invention a complete system for treating an air compressor condensate comprising water contaminated with an extremely small amount of a compressor lubricant which has a specific gravity greater than that of the water, such as triaryl phosphate.

In the drawing, the air compressor condensate, which may originate from storage or directly from an air compressor unit, not shown, is supplied as an emulsion to the condensate separation unit from conduit line 11.

The condensate is first introduced into a preseparator vessel 12 wherein the air is separated from the liquid in conventional manner. Air released from the emulsion is vented from the top of pre-separator 12 through stack or conduit 13.

The relatively air-free emulsion is withdrawn from the bottom of pre-separator 12 through conduit 14 and is passed to a manifold 15, from which it is distributed successively to a series of mixing and settling tanks 16, 17 and 18 through individual feeder lines 19, 20 and 21 controlled, respectively, by valves 22, 23 and 24. Although three tanks are shown in the drawing, fewer or more may be employed. For convenience, however, it is desirable to have three tanks so that while treatment is being effected in one tank, another is being filled and the third is being pumped, or emptied.

The tanks 16, 17 and 18 may be open at the top, as shown, or they may be covered and provided with vents to permit free air flow to and from the tanks during the periods of filling, treatment and liquid pumping. Since the rate of condensate formation in an air compressor unit is a function of the humidity, the timing arrangement for operation of the feeder line valves 22, 23 and 24 will be subject to the same condition, unless provision for surge is made somewhere between the compressor unit and the mixing and settling tanks. Thus, in the absence of surge supply the filling of the tanks 16, 17 and 18 will be under visual and manual control or under conventional liquid level control.

As each tank becomes filled with liquid condensate an emulsion breaker, or de-emulsifying agent, is added in an amount constituting about a few-tenths weight percent of the liquid batch. Calcium chloride of commercial grade has been found suitable as a de-emulsifying agent when added, in an amount constituting about 0.2 weight percent to an emulsion containing about 0.1–0.5 weight percent of triaryl phosphate.

In order to effect more rapid and intimate mixing of the reactants, there is provision for a slight flow of air into the batch undergoing treatment. Air at a line pressure of about 30 p.s.i.g., which may be obtained from the compressor section, is supplied to the mixing and settling tanks 16, 17 and 18 from supply line 25 which is manifolded into separate air feed lines 26, 27 and 28, controlled by valves 29, 30 and 31, respectively. The air feed lines discharge upwardly at a low level within the tanks, as shown.

The flow of air into the body of liquid is at a rate sufficient only to mildly agitate the mixture. In the illustrated embodiment, the tanks may be assumed to be about four feet high and to have a capacity of about 250 gallons of liquid. To this batch there is added about 4–5 lbs. of calcium chloride.

The tanks 16, 17 and 18 are provided with bottom draw-off conduits 32, 33 and 34 provided with shut-off valves 35, 36 and 37, respectively. The draw-off conduits are manifolded into conduit 38 which transfers the condensate by force of pump 39 to a coalescer 40. A pump suction strainer 41 is provided ahead of pump 39, with a valve 42 for periodic blowdown for the purpose of cleaning.

Condensate transfer line 38 is provided with a relief valve 43 which may be set to maintain a maximum pressure of about 30 p.s.i.g. in the portion of the tranfer line 38 at the discharge side of pump 39.

Coalescer 40 comprises a vertically elongated vessel internally partitioned into upper and lower chambers 44 and 45 by a horizontal tube-sheet 46. A second tube-sheet 47 is located near the top of vessel 40 and a plurality of coalescer tubes 48 are arranged vertically with their ends set in the tube-sheets 46 and 47.

The condensate drained from one of the mixing and settling tanks 16, 17 or 18 through conduit 38 is introduced into upper chamber 44 of coalescer 40 through a side inlet located at approximately the mid-level of the chamber. The heavier sludge, which may include undissolved particles of the emulsion breaker or particles of scale or rust not removed by the pump suction strainer, settles to the bottom of chamber 44 and is drained from the chamber through waste conduit 49, controlled by valve 50. The drain outlet is at the bottom of the chamber 44, as close to the tube-sheet as practicable.

The oil and water portion of the condensate passes through the coalescer tubes 48 or filter cartridges made of cotton, glass wool or other suitable filter media and descends into lower chamber 45, where the mixture undergoes a phase separation into an upper water layer and a lower oil layer. Liquid level indicator means, such as the usual external sight glasses, not shown, are provided for chambers 44 and 45 so that the zone of phase separation may desirably be maintained at an approximate central location in each chamber.

The water rising to the top of the body of condensate in chamber 45 is drawn off through side outlet conduit 51 and is passed to an adsorber section 52 for removal of contaminants. The recoverable oil settling to the bottom of chamber 45 is drawn off through bottom draw-off conduit 53 controlled by valve 54. A vent line 55 is provided at the top of vessel 40 to permit discharge of gaseous materials separated from the liquid in chamber 44.

Adsorber section 52 comprises a pair of vertically elongated vessels 56 and 57, of conventional design, provided with internal beads of activated carbon, or other suitable adsorbent material.

Conduit 51, carrying the contaminated water discharged from chamber 45 of the coalescer, is branched to provide feed conduits 58 and 59, controlled by valves 60 and 61, leading into the top of vessels 56 and 57, respectively. Vessels 56 and 57 are provided with bottom draw-off conduits 62 and 63, including valves 64 and 65, respectively, by which the purified water may be conveyed to a waste water line for disposal. Side taps 66 and 67, controlled by valves 68 and 69, are provided in the draw-off conduits 62 and 63, respectively, so that the water discharging from either adsorber vessel may be periodically checked to determine whether the phenol contamination exceeds acceptable limits.

A crossover conduit 70 is provided between adsorber feed conduits 58 and 59 downstream of valves 60 and 61. A second crossover conduit 71 is provided between adsorber draw-off conduits 62 and 63 upstream of valves 64 and 65, and a third crossover conduit 72 is provided between conduits 70 and 71. Valves 73 and 74 are provided in crossover conduit 70, at either side of its juncture with crossover conduit 72, and valves 75 and 76 are provided in crossover conduit 71, at either side of its juncture with crossover conduit 72. The crossover and valving arrangement shown permits serial flow of the contaminated water through the adsorber vessels 56 and 57 in either sequence, as well as the temporary cut-out of either vessel during operation of the system for the purpose of regeneration or removal of spent adsorbent material.

In order to insure alternate replacement of the beds of adsorbent material, the sequence of flow is reversed after each recharge of the adsorbent material, so that the bed which has been functioning alone during the temporary cut out of one adsorber will thereafter be first in the sequence of flow, and thus first to become completely spent.

Describing a typical operation of the adsorber section in accordance with the invention, valves 60, 65, 74 and 75 will be open, and valves 61, 64, 68, 69, 73 and 76 will be closed, thus permitting serial flow of the contaminated water sequentially through adsorber vessels 56 and 57. The flow path is then through conduits 51 and 58, vessel 56, conduits 62, 71, 72, 70 and 59, vessel 57, and conduit 63 to the disposable or waste water line.

The foregoing flow arrangement is maintained until the periodic checking of the discharge water from vessel 56, by opening valve 68 and withdrawing a small sample of the water through tap line 66 for testing, reveals a prohibitive excess of phenols. At such time, the adsorbent in vessel 56 is spent and must be regenerated or replaced.

To recharge adsorber 56, valves 60 and 74 are closed and valve 61 is opened. This causes all of the contaminated water from line 51 to flow through feed conduit 59, adsorber 57, and draw-off conduit 63 to the disposable water conduit, so that, temporarily, only one adsorber bed is in service. Feed conduit 58, vessel 56, drawoff conduit 62, and crossover conduits 70, 71 and 72 are then drained, and the adsorbent may be removed from vessel 56, through access means, not shown, and replaced with a fresh charge of adsorbent material.

In placing the recharged adsorber back on stream, the flow sequence is reversed by closing valves 65 and 75, and opening valves 64, 73 and 76. The flow path is then through conduits 51 and 59, vessel 57, conduits 63, 71, 72, 70 and 58, vessel 56, and conduit 62 to the disposable or waste water line. This reverse flow arrangement is then maintained until periodic checking of the waste water from vessel 57, by opening valve 69 and withdrawing a small sample of the water through tap line 67 for testing, reveals that the bed of adsorbent in vessel 57 is spent.

The system as a whole is preferably operated on a substantially continuous basis, with the various vessels being sized to accommodate the amount of condensate received from the air compressor unit. As stated, the condensate may be held in a surge or storage vessel and be supplied to the treating system at the most convenient rate for processing.

While the flow of treated water for disposal will be continuous, the flow of waste materials and recoverable lubricant from the coalescer will be on an intermittent basis. Since these separated materials are present in the condensate in very small amounts compared to the total volume of liquid handled, they may be permitted to accumulate in chambers 44 and 45 until they reach a predetermined level, as shown by the indicator means, such as sight glasses, and then be withdrawn through conduits 49 and 53. Economic considerations may determine the desirability of recovering the oil separated from the water in coalescer 40. Where an expensive lubricant such as tricresyl phosphate is employed, the expense of recovery is well justified. It may even be desirable to recover the oil from the waste sludge. In any case, it is contemplated that approximately 90% of the oil in the compressor condensate is recoverable by the method of the invention.

Obviously, many modifications and variations of the invention as hereinbefore set forth may be made without departing from the spirit and scope thereof, and therefore only such limitations should be imposed as are indicated in the appended claims.

What is claimed is:

1. The method for treating an oil-in-water, air-compressor condensate in the form of an emulsion contaminated with a small amount of a lubricating oil heavier than water and containing water-soluble components, which method comprises the steps of:
    (a) de-aerating said condensate emulsion;
    (b) adding a de-emulsifier to said emulsion;
    (c) mildly agitating the mixture from (b) in at least one treating zone sufficient only to promote mixing and to accelerate the resultant reaction, while permitting concomitant partial settling of the heavier oil-containing fraction;
    (d) withdrawing the treated liquid as a single stream from the bottom of said treating zone and passing said liquid to a coalescing zone wherein the liquid is coalesced and filtered to remove therefrom any heavy sludge material;
    (e) separating the remaining liquid in a settling zone into a lower layer comprising recoverable oil and an upper layer comprising water contaminated by said water-soluble components;
    (f) separately withdrawing said heavy sludge from the coalescing zone and said recoverable oil from the settling zone; and
    (g) passing said contaminated water through an adsorbing zone containing a body of adsorbent material so as to remove said water-soluble components and to render said water acceptable for waste disposal.

2. The method as in claim 1, in which said mixture is agitated within said treating zone by the flow of gaseous material introduced at a low level within said treating zone.

3. The method as in claim 2, in which said lubricating oil is triaryl phosphate constituting less than one weight percent of said condensate.

4. The method for treating an oil-in-water, air compressor condensate in the form of an emulsion contaminated with less than about one weight percent of triaryl phosphate which comprises the steps of:
    (a) de-aerating said condensate emulsion;
    (b) adding calcium chloride to said emulsion;
    (c) passing the treated emulsion through a coalescing zone wherein the emulsion is coalesced and filtered to remove any heavy sludge material;
    (d) separately withdrawing from said coalescing zone the heavy sludge and the remaining liquid;
    (e) passing the remaining liquid to a separating zone to separate said liquid by settling into a lower layer comprising recoverable oil and an upper layer comprising water contaminated by water-soluble components; and
    (f) passing said contaminated water through an adsorbing zone for the removal of said water-soluble components.

5. The method as in claim 4, in which said triaryl phosphate constitutes between about 0.1 and 0.5 weight percent of said condensate emulsion and about 0.2 weight percent of said calcium chloride is added to said emulsion.

References Cited
UNITED STATES PATENTS

| | | | |
|---|---|---|---|
| 766,300 | 8/1904 | Ward | 210—259 |
| 2,102,051 | 12/1937 | Woelflin | 252—360 |
| 2,730,190 | 1/1956 | Brown et al. | 55—45 |
| 2,761,563 | 9/1956 | Waterman et al. | 252—330 |
| 2,766,203 | 10/1956 | Brown et al. | 210—259 |

REUBEN FRIEDMAN, *Primary Examiner.*

C. N. HART, *Assistant Examiner.*